United States Patent [19]

Daniele et al.

[11] Patent Number: 5,576,734

[45] Date of Patent: Nov. 19, 1996

[54] KEYBOARD EMULATOR SYSTEM

[75] Inventors: Joseph A. Daniele, Leeds Point; Haim S. Gabrieli, Margate, both of N.J.

[73] Assignee: The Mitre Corporation, Bedford, Mass.

[21] Appl. No.: 420,714

[22] Filed: Apr. 11, 1995

Related U.S. Application Data

[63] Continuation of Ser. No. 142,083, Oct. 28, 1993, abandoned.

[51] Int. Cl.$^6$ .................................................. G09G 5/00
[52] U.S. Cl. ........................... 345/168; 345/1; 395/500; 364/145; 364/189; 341/22
[58] Field of Search ............................ 395/275, 500, 395/550; 364/146, 147, 188, 189, 709.01, 145; 345/156, 164, 168, 1; 341/22; 434/227

[56] References Cited

U.S. PATENT DOCUMENTS

| | | | |
|---|---|---|---|
| 4,431,988 | 2/1984 | Molusis | 345/168 |
| 4,755,808 | 7/1988 | Bullock | 345/163 |
| 4,964,075 | 10/1990 | Shaver | 364/709.01 |
| 5,088,033 | 2/1992 | Binkley | 364/DIG. 1 |
| 5,121,472 | 6/1992 | Danish | 395/275 |
| 5,214,785 | 5/1993 | Fairweather | 395/275 |
| 5,386,360 | 1/1995 | Wilson et al. | 364/146 |

OTHER PUBLICATIONS

Plaisant, C. et al "Scheduling On–Off Home Control Devices" U. of MD. Nov. 4, 1989.
Plaisant, C et al "Scheduling Home Control Devices" Int J Man–Machine Studies 36:375–393, 1992.
William Barden, Jr. "Color Computer Assembly Language Programming" 1983 by Radio Shack p. 63.

*Primary Examiner*—Richard Hjerpe
*Assistant Examiner*—Lun-Yi Lao
*Attorney, Agent, or Firm*—Morton J. Rosenberg; David I. Klein

[57] ABSTRACT

A keyboard emulator system (10) is provided for transmitting simulated keyboard and track ball entries to a control console (100) of a real time data processing system. The simulated keyboard and track ball entries are stored in a script file and sequentially read therefrom, converted to a predetermined format for transmission to the main display controller (130) of control console (100) responsive to a correspondence between a reference time stored in the script file and the current time-of-day provided from a clock subsystem (260). The time-of-day provided by clock subsystem (260) is initialized by a time-of-day value read from the clock subsystem (146) of the control console (100), thereby allowing the simulated keyboard entries to correspond with other data being transmitted to the control console (100) from the main frame computer (102) as part of a test procedure.

7 Claims, 18 Drawing Sheets

Microfiche Appendix Included
(1 Microfiche, 64 Pages)

```
SIM02   123505 M V/RS   0,200    700,50
SIM01   123505 M V/MC   0,350    700,200
SIM02   123525 M V/FP   IPL      700,350   1240,200
SIM02   123535 M V/AR   700,200  1240,50
SIM12   1240,200  1780,50
SIM01   123536 TB 150,1735
SIM01   123537 TB SELECT
COM00
COM00   DISPLAY SPECIFIED VIEWS ON THE MAIN DISPLAY
SIM02   123600 DS V/SN  500,2000  2000,400
SIM01   123610 DS V/WL  0,2000    450,1850
SIM01   123620 DS V/DP  0,1750    450,1250
SIM02   123630 DS V/NP  0,1150    450,650
COM00
COM00   DISPLAY A VIEW ON THE AUXILIARY DISPLAY
SIM02   123700 DS V/GI  A
COM00
```

FIG.2

KEYBOARD EMULATOR SYSTEM

This is a continuation of application Ser. No. 08/142,083 filed on Oct. 28, 1993, now abandoned.

A Microfiche Appendix is included in this application containing one (1) microfiche. The microfiche is entitled "SOURCE CODE FOR KEYBOARD EMULATOR SYSTEM", containing sixty-three (63) frames plus one (1) test target frame for a total of sixty-four (64) frames.

BACKGROUND OF THE INVENTION

1. Field of the Invention

This invention directs itself to test systems for simulating keyboard entries to consoles of real time data processing systems. In particular, this invention directs itself to a keyboard emulator system for transmitting simulated keyboard entries at predetermined time periods to one or more data processing consoles. More in particular, this invention directs itself to a keyboard emulator system capable of providing simulated cursor positioning data entries, entered from an emulator keyboard in addition to simulated character and function key entries. Further, this invention directs itself to a keyboard emulator system where keyboard character keys, function keys and track ball switch and position data is entered utilizing alphanumeric tags, the tags being converted to a predetermined code value prior to transmission to a console being tested. Still further, this invention directs itself to a keyboard emulator that initializes its time-of-day clock with a time-of-day value read from the console to which the simulated keyboard entries are transmitted.

2. Prior Art

Keyboard emulation systems are well known in the art. The best prior art known to the Applicant include U.S. Pat. Nos. 4,312,066; 4,636,940; 4,641,274; 4,920,481; 5,022,028; 5,045,944; 5,047,926; 5,065,360; 5,088,033; 5,121,472; 5,148,155; 5,157,782; and, 5,214,785.

In some prior art systems, such as that disclosed by U.S. Pat. Nos. 5,157,782 and 5,065,360, keyboard emulation is provided from data stored in a data file. Such systems are capable of emulating the output of several different types of keyboards, but simply "play back" key strokes which have been entered previously. These systems make no provision for transmitting the simulated keyboard data entries at predetermined times, let alone providing such times in synchronism with the time-of-day clock of the host processor to which the simulated signals are being transmitted. Further, such systems provide no means of entering keystroke data in the form of alphanumeric tags.

In other prior art systems, such as that disclosed by U.S. Pat. Nos. 5,214,785; 5,148,155; and 4,920,481 emulated keyboard characters are transmitted to particular host processors. In addition to keyboard entries, such systems are capable of inserting simulated movements and button clicks of a cursor positioning device such as a mouse. However, none of these systems provide transmission of simulated keyboard or cursor positioning data entries at particular predetermined time periods, as provided by the instant invention.

SUMMARY OF THE INVENTION

A keyboard emulator for coupling to at least one control console of a real time processing system, having a console keyboard, a cursor positioning device and a display controller is provided. The keyboard emulator includes an input/output interface subsystem coupled to both the console keyboard and the display controller for receiving first keyboard command signals from the console keyboard and transmitting second keyboard command signals to the display controller. The keyboard emulator also includes an emulator processing subsystem coupled to the input/output interface subsystem for establishing a succession of the second keyboard command signals and controlling transmission thereof. The emulator processor includes (1) a clock subsystem for establishing first time-of-day data, and (2) the means by which the first time-of-day data is initialized with the second time-of-day data, read from the display controller of the control console. The keyboard emulator is provided with an emulator keyboard coupled to the emulator processor for entering emulator commands, emulator data, and third time-of-day data. Further, the keyboard emulator includes a storage subsystem coupled to the emulator processor for storage of the emulator data and the third time-of-day data in a script file. The emulator processor sequentially reads the script file to form the succession of the second keyboard command signals from the emulator data responsive to a predetermined one of the emulator commands. The emulator processor transmits the second keyboard command signals responsive to a correspondence between the third time-of-day data and the first time-of-day data.

BRIEF DESCRIPTION OF THE DRAWINGS

FIG. 2 is a depiction of an exemplary script file for use by the keyboard emulator system;

DESCRIPTION OF THE PREFERRED EMBODIMENTS

Figure 1:
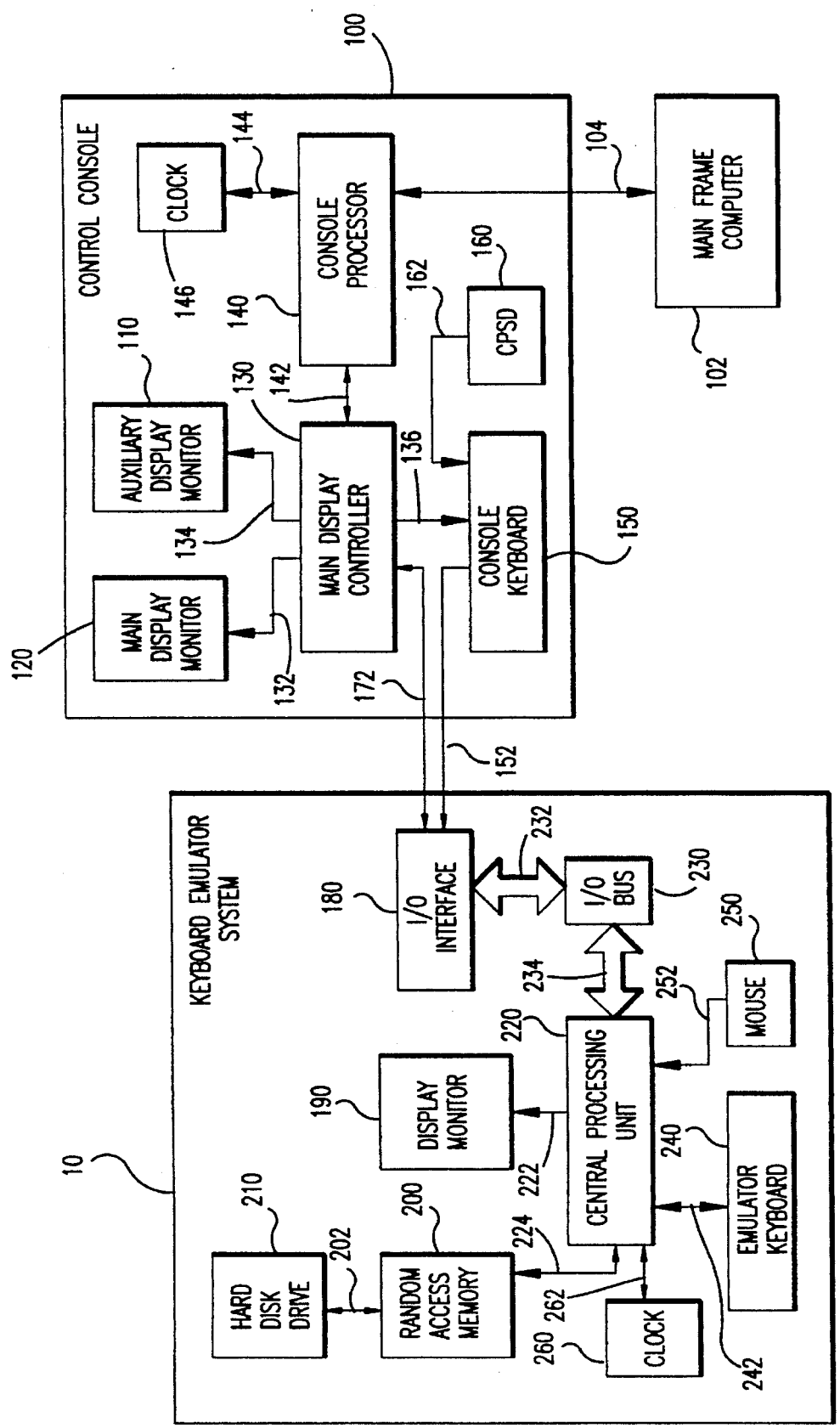
FIG. 1 is a system block diagram of the keyboard emulator and its connection to a control console.

Referring now to FIGS. 1–18, there is shown, keyboard emulator system 10 for simulating keyboard entries and cursor positioning data to at least one control console 100 of a real time processing system, such as an air traffic control system. As will be seen in following paragraphs, keyboard emulator system 10 is specifically directed to the concept of providing keyboard and cursor positioning entries to the main display controller 130 of the control console 100 from a script file previously established as a result of entries made on the emulator keyboard 240 of system 10. Although not restricted to application to real time processing control consoles, keyboard emulator system 10 is particularly adapted for testing advanced automation systems, wherein data entries must be made at specific times of the day, or within specific time periods following a specific event or prior entry. Further, keyboard emulator system 10 is particularly adapted for the substantially simultaneous transmission of simulated keyboard and cursor positioning entries, which may differ from one console to another, as well as sending identical or differing entries to particular consoles at different time periods.

The control console 100 is coupled to a main frame computer 102 by the data link 104 for exchanging data therewith. Console control 100 may be one of a plurality of consoles, each carrying out a different function, as in an air traffic control network, wherein multiple consoles are utilized for controlling multiple aircraft in different portions of air space. Control console 100 includes a console processor 140 which communicates with the main frame computer 102 and the main display controller 130 of the console. Additionally, a clock subsystem 146 is coupled to the console processor 140 by a data link 144. Clock subsystem 146 provides time-of-day data to the console processor and is initialized by data transmitted from the main frame computer 102. Thus, at system start-up and other times triggered by particular events, main frame computer 102 may transmit time-of-day data to all of the control consoles coupled thereto, thereby providing time-of-day synchronization throughout the entire real time data processing system. Of particular importance to the operation of keyboard emulator system 10 is the ability to synchronize the emulator clock subsystem 260 with the time-of-day data from the control console clock subsystem 146.

The main display controller 130 of control console 100 provides the interface between (1) the main display monitor 120, through the data link 132, (2) the auxiliary display monitor 110, through the data link 134, (3) the console keyboard 150 through the data link 136, and (4) the input/output interface 180 of the keyboard emulator system 10. The main display monitor 120 may be a 20"×20" high resolution display monitor for displaying graphic patterns, such as air traffic and weather patterns. Auxiliary display monitor 110 may be a 16" diagonal display monitor for use in displaying static information, which may be graphic data in the form of sector maps. The console keyboard 150 provides character key and function key entries encoded in a predetermined format. Additionally, a cursor positioning/ selection device 160 is coupled to the console keyboard 150 by the data link 162, for providing coupling of the cursor position data and selection switch functions. In particular, the cursor positioning/selection device 160 is a track ball type cursor positioning device having at least three switch functions associated therewith, including "SELECT", "ENTER" and "HOME". The particular meaning of these functions is not important to the inventive concept, it is only necessary to understand that the cursor positioning device includes particular switch functions which must be simulated by system 10. However, the method by which those functions are specified in the script file is of particular importance, and will be described in following paragraphs.

Keyboard emulator system 10 is a computer based system having a central processing unit 220. Central processing unit 220 may be a central processing unit of a personal-type computer, such as a standard IBM personal computer, or compatible. The central processing unit 220 communicates with the control console 100 through an input/output interface 180, the interface 180 being coupled to the computer platform's I/O bus 230 by the data link 232, the I/O bus 230, in turn, being coupled to the central processing unit 220 by the data link 234. I/O interface 180 is coupled to the control console 100 by a data link 152 providing coupling to the console keyboard 150 and a data link 172 providing coupling to the main display controller 130.

Central processing unit 220 is coupled to input devices such as the emulator keyboard 240 and the mouse 250. Mouse 250 is coupled to the central processing unit 220 by a data link 252, allowing a user to select particular options displayed on a display monitor 190 by virtue of the cursor position displayed thereon. The cursor position is responsive to displacement of mouse 250 relative to a reference surface, as is well known in the art. Emulator keyboard 250 is coupled to central processing unit 220 by a data link 242 for providing all commands and entries necessary for establishing the simulated data entries to be supplied to the control console 100. As was previously mentioned, keyboard emulator system 100 includes a clock subsystem 260 coupled to central processing unit 220 by data link 262 for maintaining time-of-day data, the importance of which will become apparent in following paragraphs. Central processing unit 220 is further coupled to data storage subsystems through the data link 224, such being in the form of random access memory 200 and hard disc drive 210, through the data link 202.

Input/output interface 180 is a multi-port device, with each of the multiple input/output ports being selectively addressable. Thus, multiple control consoles can be coupled to a single keyboard emulator system, with respective commands being sent to each substantially simultaneously, within nanoseconds of each other. Since all of the control consoles are coupled to a common main frame computer 102, time-of-day synchronization of the keyboard emulator system 10 with any control console 100 provides time-of-day synchronization with all of the consoles. As all of the control consoles are identical, and each interfaces with keyboard emulator system 10 in a similar manner, only a single control console 100 is shown in FIG. 1. It should be understood that the coupling of multiple control consoles is simply a matter of duplicating that which is shown, the data links 152 and 172 from each of the control consoles being coupled to a respective I/O port of the I/O interface 180.

Central processing unit 220 provides the simulated keyboard and track ball data entries for transmission to the main display controller 130 of control console 100 subsequent to reading data from a script file which has been transferred from hard disc drive 210 to the random access memory 200. An exemplary script file is shown in FIG. 2. The script file contains two types of data entries, a simulated keyboard/ track bail entry ("SIM") and a comment entry ("COM"). The COM entries are non-executable statements which are used as explanatory entries or for spacing groups of SIM entries within the script file, and are not transmitted to the control console 100. For each of the SIN entries, the fourth column identifies the line number for a particular message, permitting multiple lines to be utilized for a single set of data entries. The character in the next column, column 5, identifies the particular control console to which the simulated keyboard or track ball entry is to be transmitted, In columns 7–12 of the first line of a data entry there is provided time reference data, which is a time stamp indicating the time-of-day the simulated data entry is to be transmitted to the main display controller 130 of the control console 100. Following a delimiting space, columns 14–70 are reserved for the simulated entry data. Thus, the variable length field of columns 14–70 store alphanumeric characters entered through the conventional personal computer keyboard which defines emulator keyboard 240, wherein the switch functions of the track ball, such as the "SELECT" switch function, is simply spelled out to note entry of that switch function, as are the other function keys and such functions as "ENTER", "CLEAR", "BACKSPACE", etc. Track ball cursor entries are defined as two coordinate entries, each being within the range of 0–2048, representing the number of pixels available in each direction of the main display monitor 120 of control console 100. Thus, the central or "HOME" position is identified by the coordinates 1024, 1024, with all positioning entries being referenced relative to that central position, for determining whether the cursor movement will be up, down, left or right of that central position.

Figure 3:
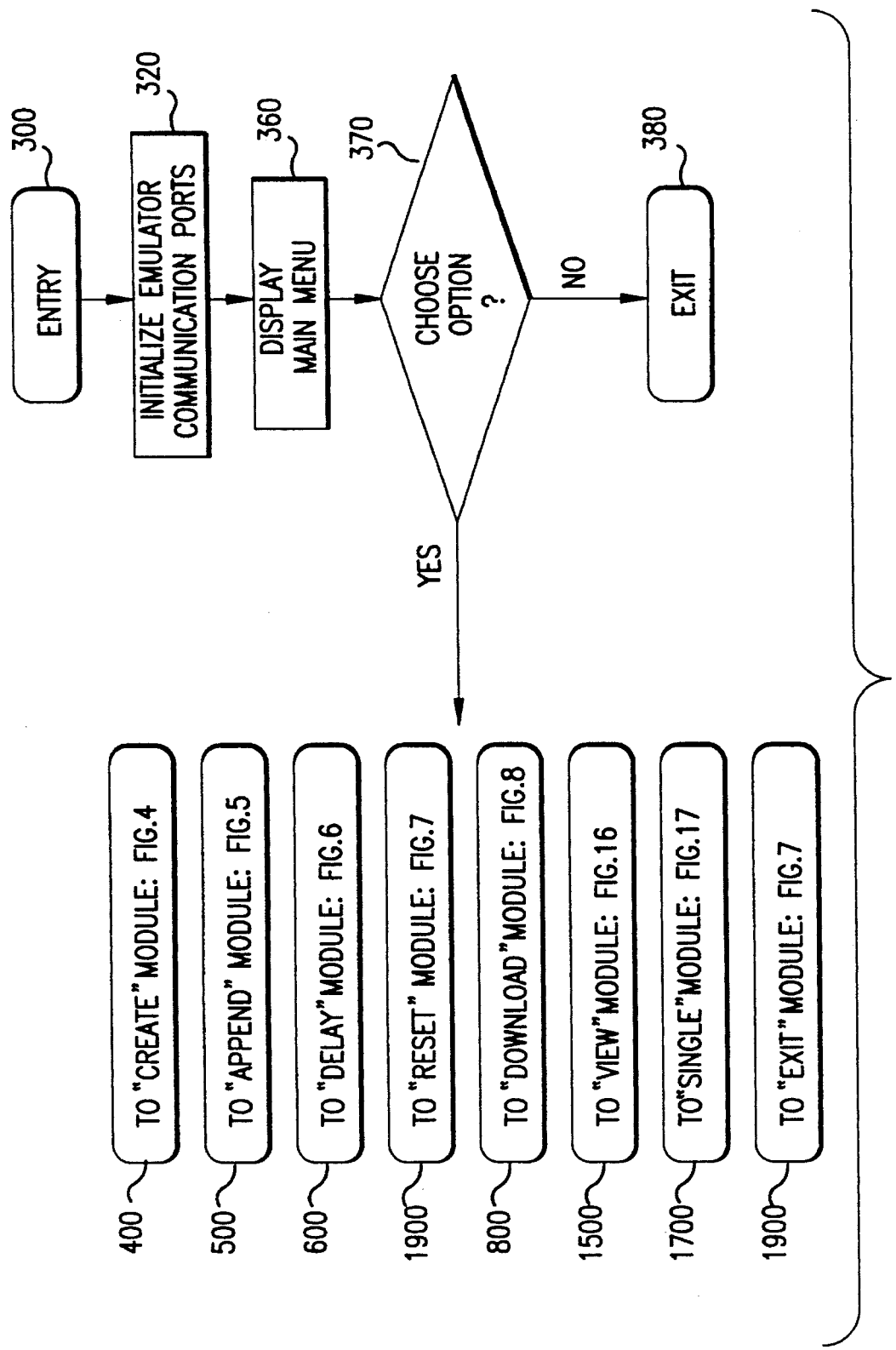
FIG. 3 is a flow diagram of the main emulator program.

Referring now to FIG. 3, there is shown, a flow diagram for the main menu portion of the emulator software. Beginning with the entry point 300 the flow passes to block 320, representing instructions for initializing the emulator communications ports, initialization of the input/output interface 180. Subsequent to the I/O interface initialization, the main menu is displayed on display monitor 190, as indicated in block 360. The user may select any one of a plurality of options from the menu, utilizing the mouse 250 or making the appropriate keyboard entry on emulator keyboard 240. Thus, the flow goes from the display of the main menu in block 360 to the decision block 370, wherein it is determined whether the user wishes to branch to a particular menu choice, if none of the options are desired, the user can elect to exit from the program in block 380.

Figure 4:
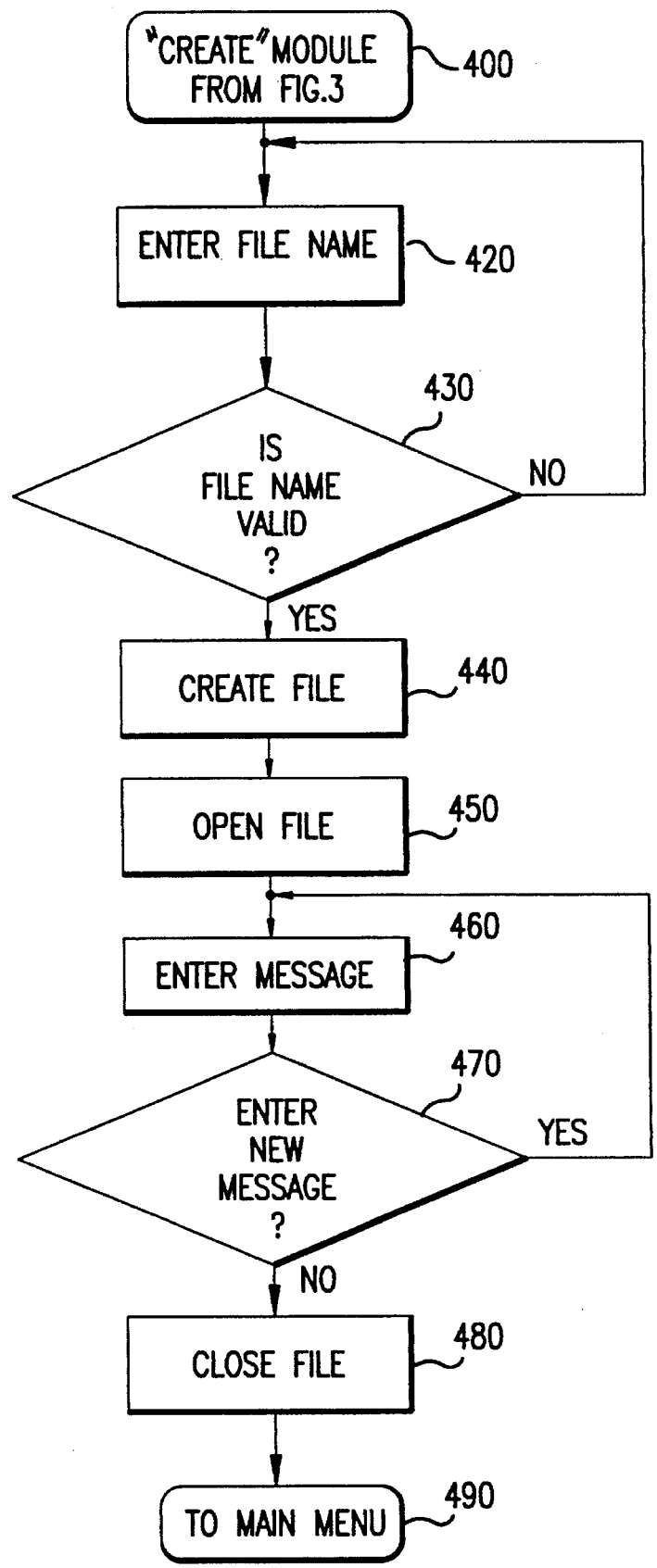
FIG. 4 is a flow diagram of the "Create" module.

If on the other hand the user selected the "Create" module, for example, the program branches to the module entry point 400, shown in FIG. 4. From entry point 400, the flow goes to block 420 wherein the user enters the particular file name for the file which will be created. Following entry of the file name in block 420, the flow passes to decision block 430, wherein it is determined whether the file name is valid, meets the system requirements as to character length and syntax. If the name is not valid, the flow passes back to block 420, wherein the user receives a prompt to retry entering a file name. If the entered file name is valid, flow passes from decision block 430 to block 440 which identifies the step of creating a file identified by the entered name, by steps well known in the computer art. This file may be a script file which will subsequently be loaded with commands simulating keyboard entries for console 100.

Following creation of the file, the flow moves to block 450, wherein the file is opened, the emulator creating space in the random access memory for the file. Subsequent to the File being opened, flow moves to block 460 which identifies entry of the messages, the data, which is stored in the file for subsequent transmission to the command console 100, if the file is a script file. After entering a line of data, the flow moves to decision block 470, for determining whether additional message lines are to be added to the file. This step is accomplished by prompting the user as to whether more data is to be entered. If more data will be entered, the flow moves back to block 460 for receipt of the next line of data. Once the user has indicated that no new data is to be entered, the flow passes to block 480, wherein the script file is closed and then flow passes back to the main menu through block 490.

Figure 5:
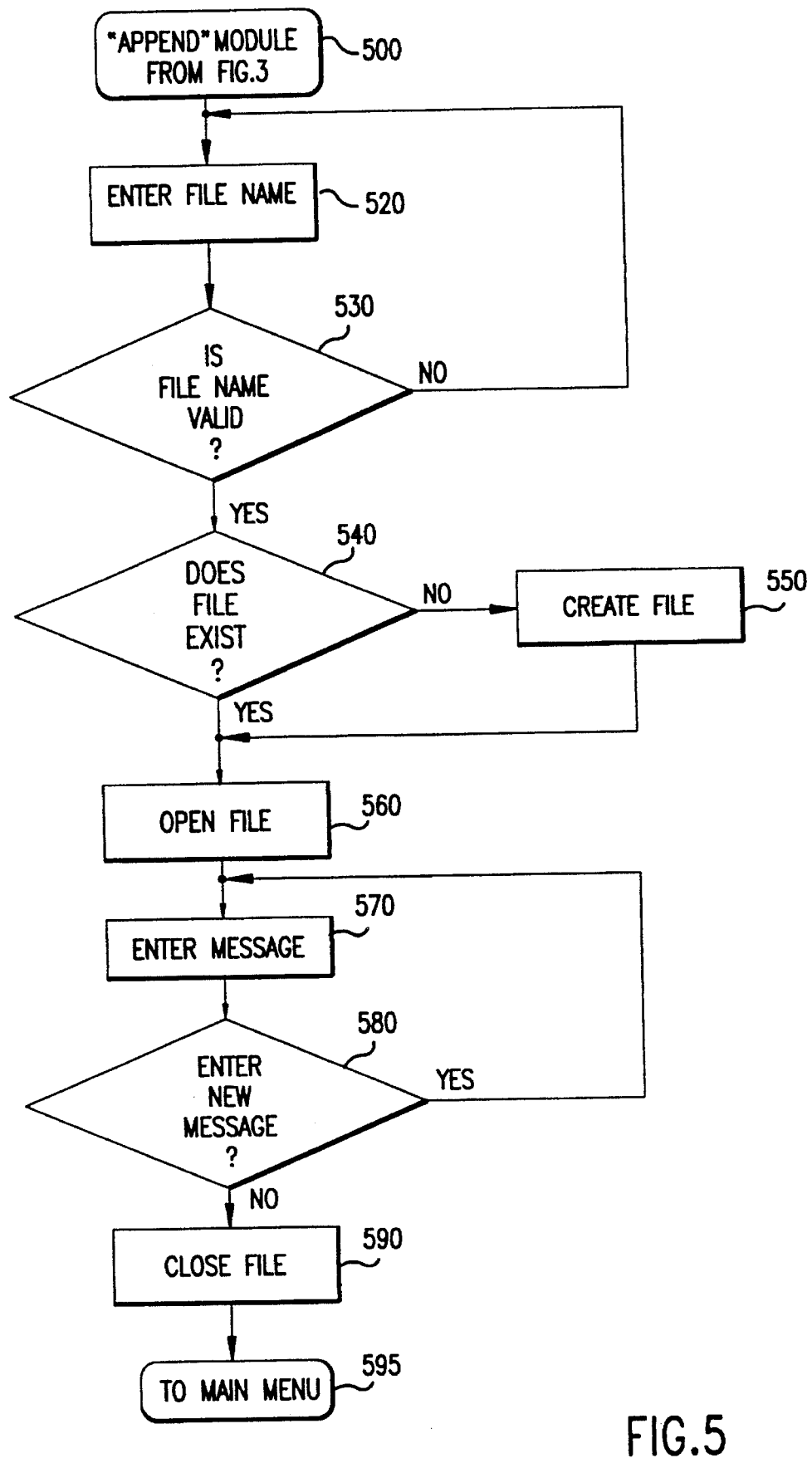
FIG. 5 is a flow diagram of the "Append" module.

If the user chose the "Append" function in FIG. 3, then the flow jumps to block 500 of FIG. 5. From block 500, the flow continues to block 520 wherein the user receives a prompt to enter a file name. When the file name is entered, the flow passes to decision block 530, wherein the file name is tested to determine if it is valid. If it is not valid, flow returns to block 520 for entry of a proper file name, as has been previously described for the "Create" module. If a valid file name has been entered, the flow passes to decision block 540, wherein it is determined whether that file already exists. If the file exists, then flow passes to block 560, wherein the file is opened. If on the other hand, the file does not already exist, flow passes to block 550 wherein the file is first created and then the flow passes to block 560 for opening that file. When the file is opened in block 560, a file pointer provides the address of a location for entry of new data at the end of the file, which may be the beginning of a file if such was newly created, but will otherwise be in the next available space beyond the last record already in the file. Thus, when messages are entered, they are appended to the end of the existing file.

From the open file block 560 flow passes to the "Enter Message" block 570, wherein the user receives a prompt to enter the message to be added to the file. Subsequent to entry of a line of data, the user is prompted as to whether a new message is to be entered. Thus, the flow passes to the decision block 580 wherein flow will pass back to the "Enter Message" block 570 if new messages are to be entered. If new messages are not to be entered, the flow then passes from decision block 580 to the closed file block 590. The closed file function copies the data from the file space in random access memory 200 to storage space in the hard disc drive 210. From block 590 the flow returns to the main menu in block 595.

Figure 6:
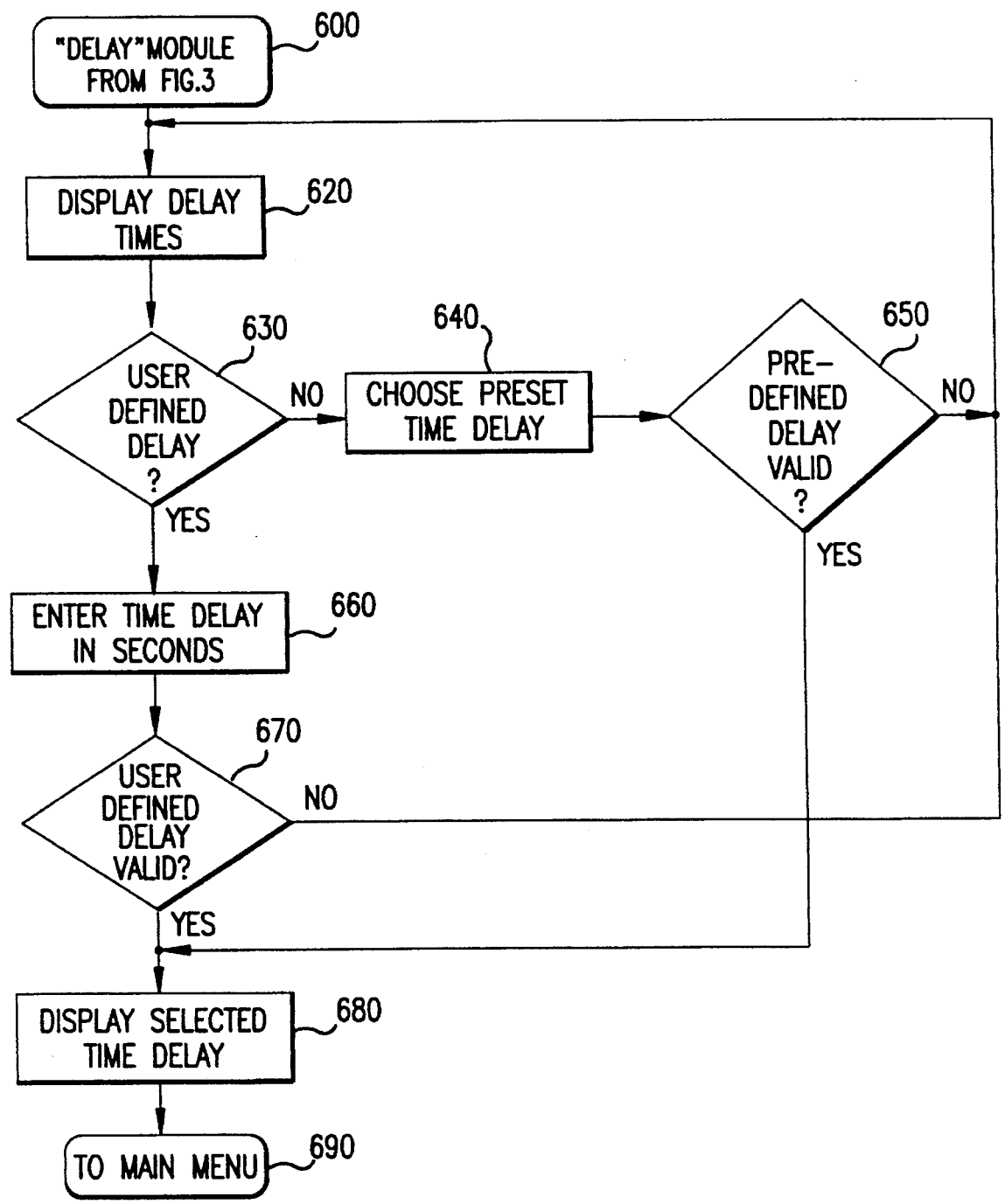
FIG. 6 is a flow diagram of the "Delay" module.

When the user selects the "Delay" function from the main menu, FIG. 3, the flow passes to the "Delay" module entry block 600, shown in FIG. 6. From entry block 600 the flow passes to the block 620, where predetermined delay times are displayed for the user's selection. From block 620 the flow passes to the decision block 630, wherein the user indicates whether a predetermined delay time will be selected or in the alternative, the user will define his own delay time period. If the user intends to define his own delay time period, the flow passes to block 660 wherein the desired time is entered, in seconds. From block 660 the flow passes to decision block 670 wherein it is determined whether the selected delay period is valid, based on criteria not important to the inventive concept.

If the user chose to select a predetermined delay, the flow from decision block 630 passes to block 640, wherein the user makes that selection. Although the predetermined delays have been programmed into the system and should be valid, a test is performed in block 650 as flow passes from the selection block 640 thereto. If the chosen preset delay is not valid, flow passes back to block 620 for repetition of this sequence. Similarly, if in decision block 670 the user defined delay is determined to be invalid, flow passes back to block 620. When a valid time delay is identified, in either block 670 or block 650, the flow passes to block 680, wherein the selected delay is displayed to the user and stored for subsequent use, as will be described in following paragraphs.

Figure 7:
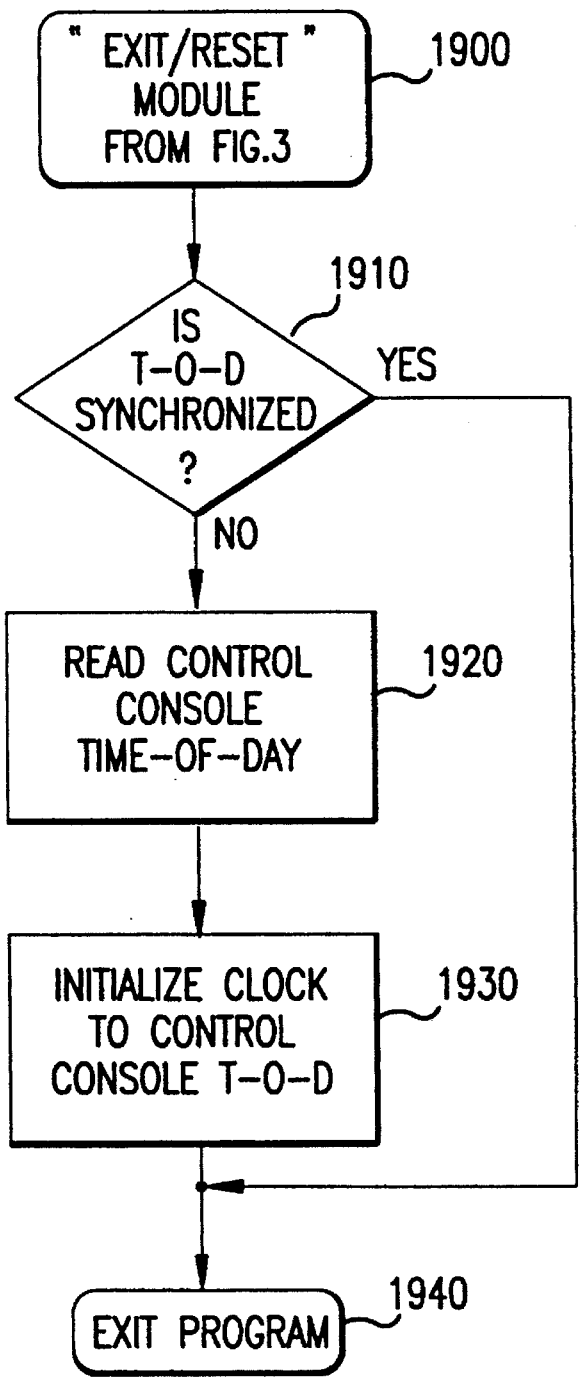
FIG. 7 is a flow diagram of the "Exit/Reset" module.

If the user selected the "Reset" function from the main menu, then flow passes from block 370, shown in FIG. 3, to the "Exit/Reset" entry point, 1900 shown in FIG. 7. From the entry block 1900 flow passes to the decision block 1910, wherein it, is determined whether the time-of-day clock 260 is synchronized with the time-of-day clock 146 of the control console 100. If such has been synchronized, then flow passes to the exit program block 1940, which terminates the execution of the keyboard emulator software. If the time-of-day clock has not been synchronized, flow passes to block 1920 wherein the time-of-day clock 146 of the control console 100 is read into the emulator. Flow then passes to block 1930 where the clock 260 is initialized to the time-of-day read from the control console. From block 1930 the flow passes to the exit program block 1940. The clock subsystem 260, subsequent to this initialization, increments the value of the time-of-day data to maintain a current time-of-day value.

Figure 8:
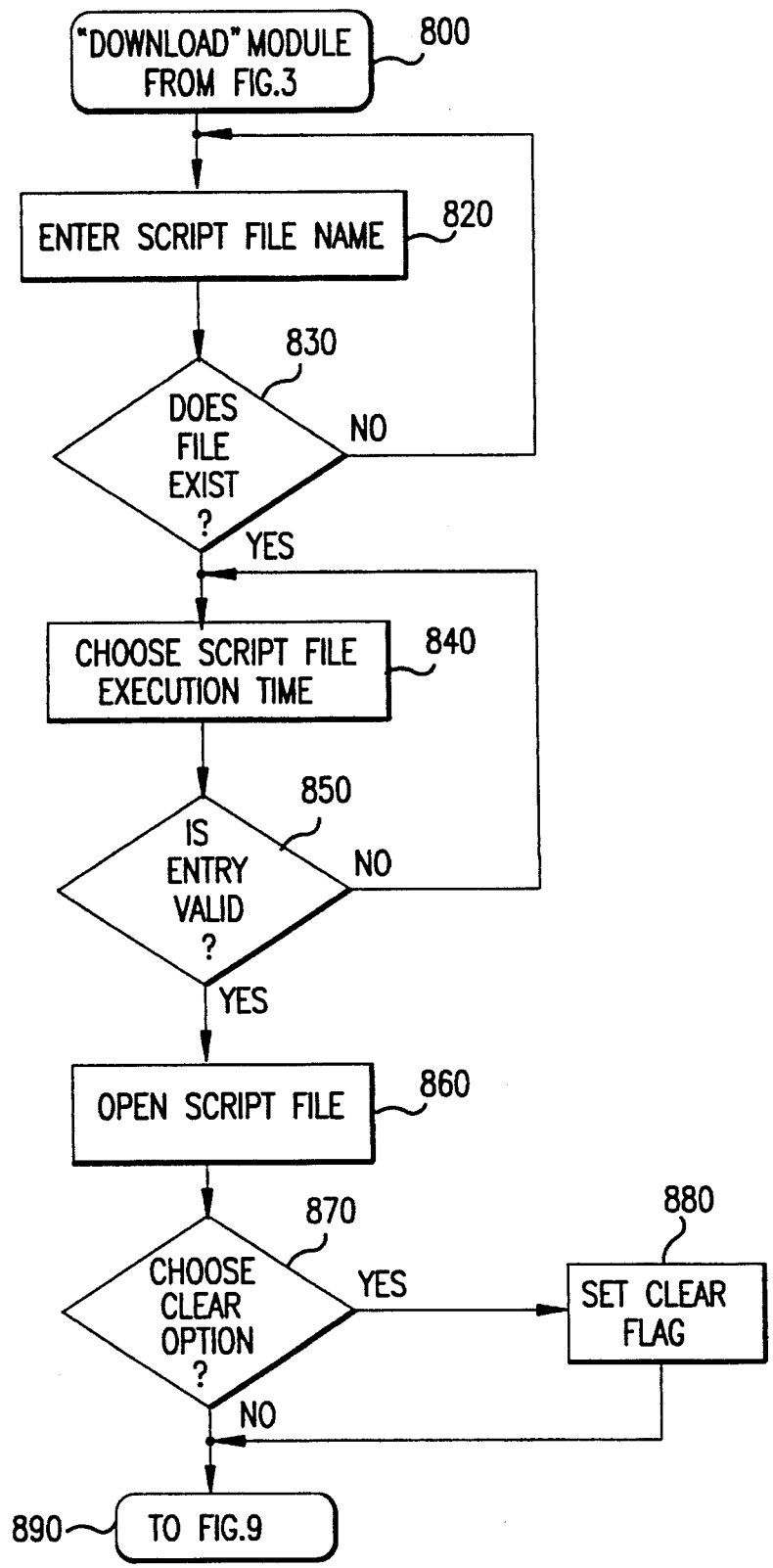
FIGS. 8–15 is a series of flow diagrams for the "Download" module.

If the user selected the "Download" function from the main menu, flow from block 370 passes to the "Download"

entry block 800, shown in FIG. 8. From entry block 800 the flow passes to the block 820, wherein the user is prompted to enter a script file name. Subsequent to the entry of the script file name, the flow passes to decision block 830, wherein it is determined whether that file has been created, as by the "Create" function described with reference to FIG. 4. If it does not exist, the flow passes back to block 820 to re-request entry of a script file name. If the file is found to exist, the flow passes to block 840. In block 840, the user determines the number of times in which the script file will be executed, the number of times the whole sequence of instructions stored in the file will be repeated. From block 840, the flow passes to decision block 850, wherein it is determined whether the number of execution times entry is valid. Here again, the particular criteria used to determine validity is not important to the inventive concept.

If the entry was not valid, flow passes back to block 840 to repeat the associated user prompt and obtain an entry. If an entry is valid, the flow passes from decision block 850 to the block 860, wherein the particular named script file is opened, memory space in RAM made available and the file transferred from the hard disc drive 210 thereto. From block 860 the flow passes to decision block 870, wherein it is determined whether the user wishes to select the "CLEAR" option. The "CLEAR" function is a function key selection available on the control console keyboard 150 which clears the message composition area, and thus at this point in the flow insures that no extraneous data is in the keyboard entry buffer of the main display controller 130. If the "CLEAR" option is selected, flow passes to block 880 wherein the "CLEAR" flag is set, and then flow passes to the connector block 890, as does the Flow if the "CLEAR" option is not selected.

Figure 9:
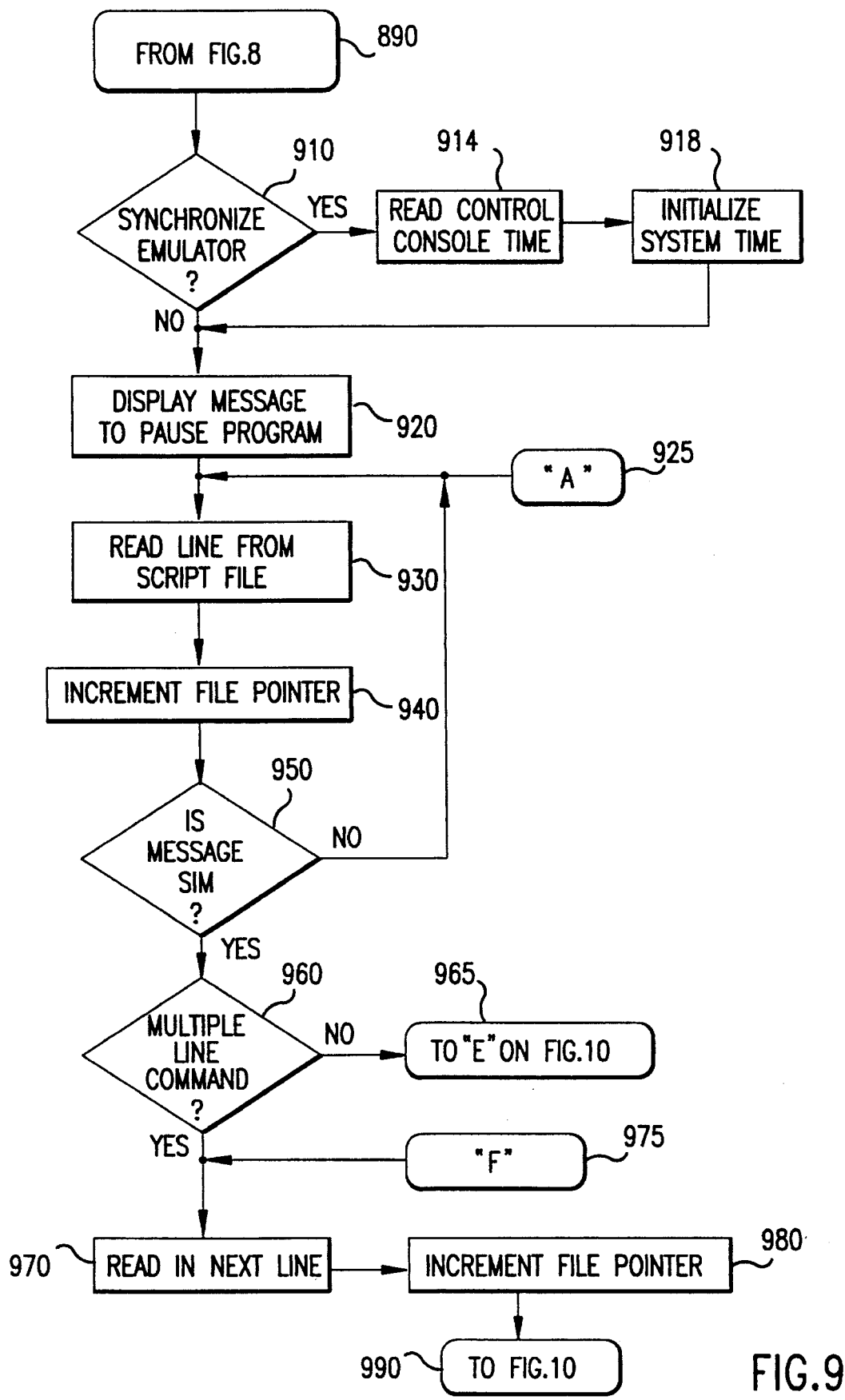

From the connection block 890, shown in FIG. 9, flow passes to the decision block 910 for determination of whether the emulator is synchronized with a control console 100. If the emulator is synchronized, flow passes to block 920. If on the other hand, the emulator is not synchronized, flow passes to block 914 where the time-of-day data is read from the control console. Flow then passes to block 918, wherein the time-of-day stored in clock 260 is initialized to the value read from the control console. From block 918, the flow then passes to block 920 for display of a message indicating to the user that the program can be paused by pressing the "ESCAPE" key, as will be further described in following paragraphs. Flow then passes to block 930 wherein a line from the script file is read, and then the file pointer is incremented, as indicated in block 940. From block 940, the flow passes to decision block 950, which functions to distinguish between comment lines and simulated keyboard entries. If the first three columns of the script file records read do not have the characters "SIM", then flow passes back to block 930, as only messages which begin with the characters "SIM" are processed and transmitted to the display controller 130 of a particular control console 100, From block 950, the flow passes to decision block 960 if the characters "SIM" are present. Decision block 960 determines whether the message is a multi-line command, such is indicated by the character in the fourth column of the script file record. If the character in the fourth column is a "0", such indicates that it is not a multiple line command, and therefore, flow passes to the connection block 965 of FIG. 10. If the character in column 4 of the records is other than a "0", then flow passes to block 970 wherein the next line is read from the file. Following the reading of a line, the flow passes to block 980 wherein the file pointer is incremented, and then flow passes to the connector block 990.

Figure 10:
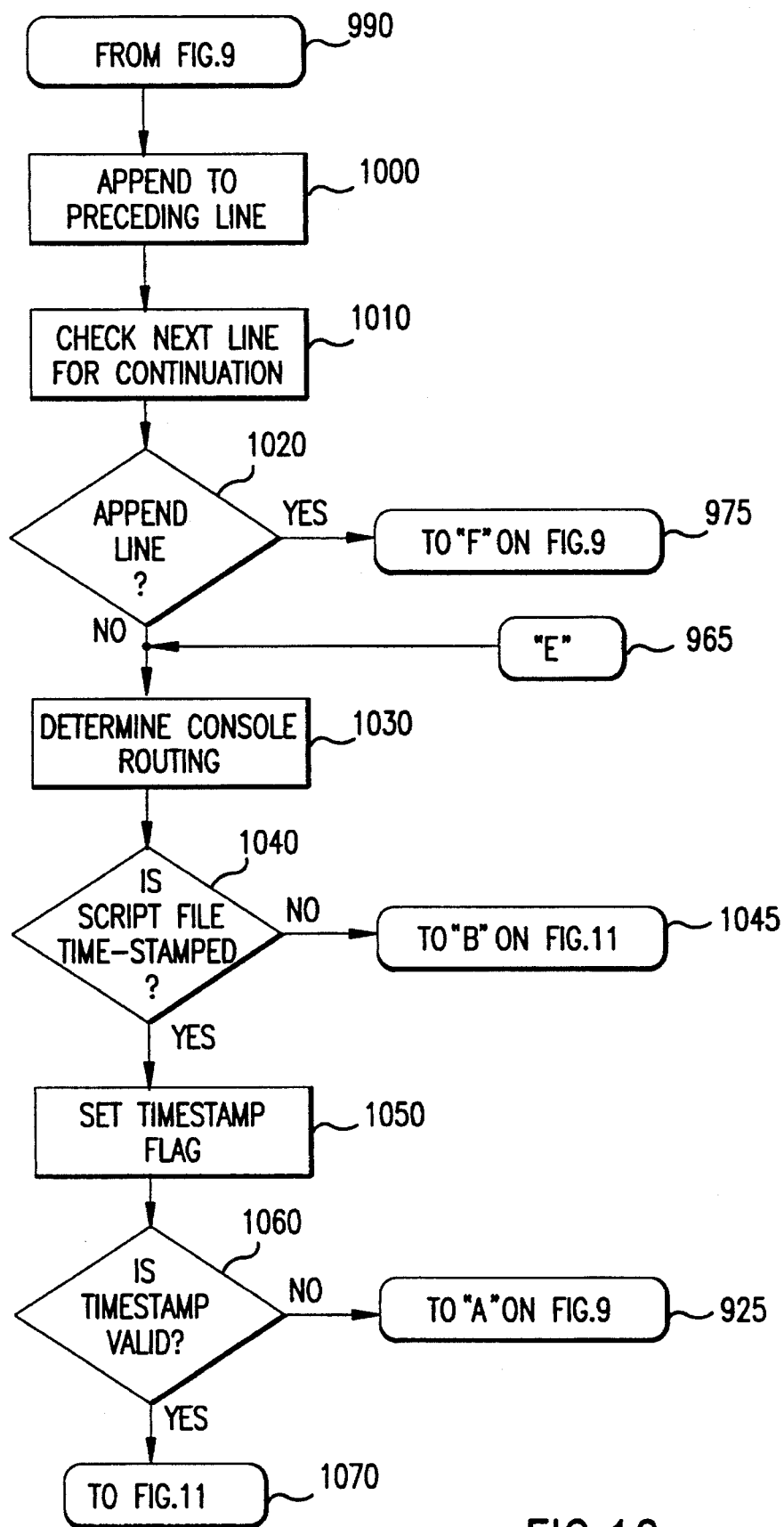
Figure 11:
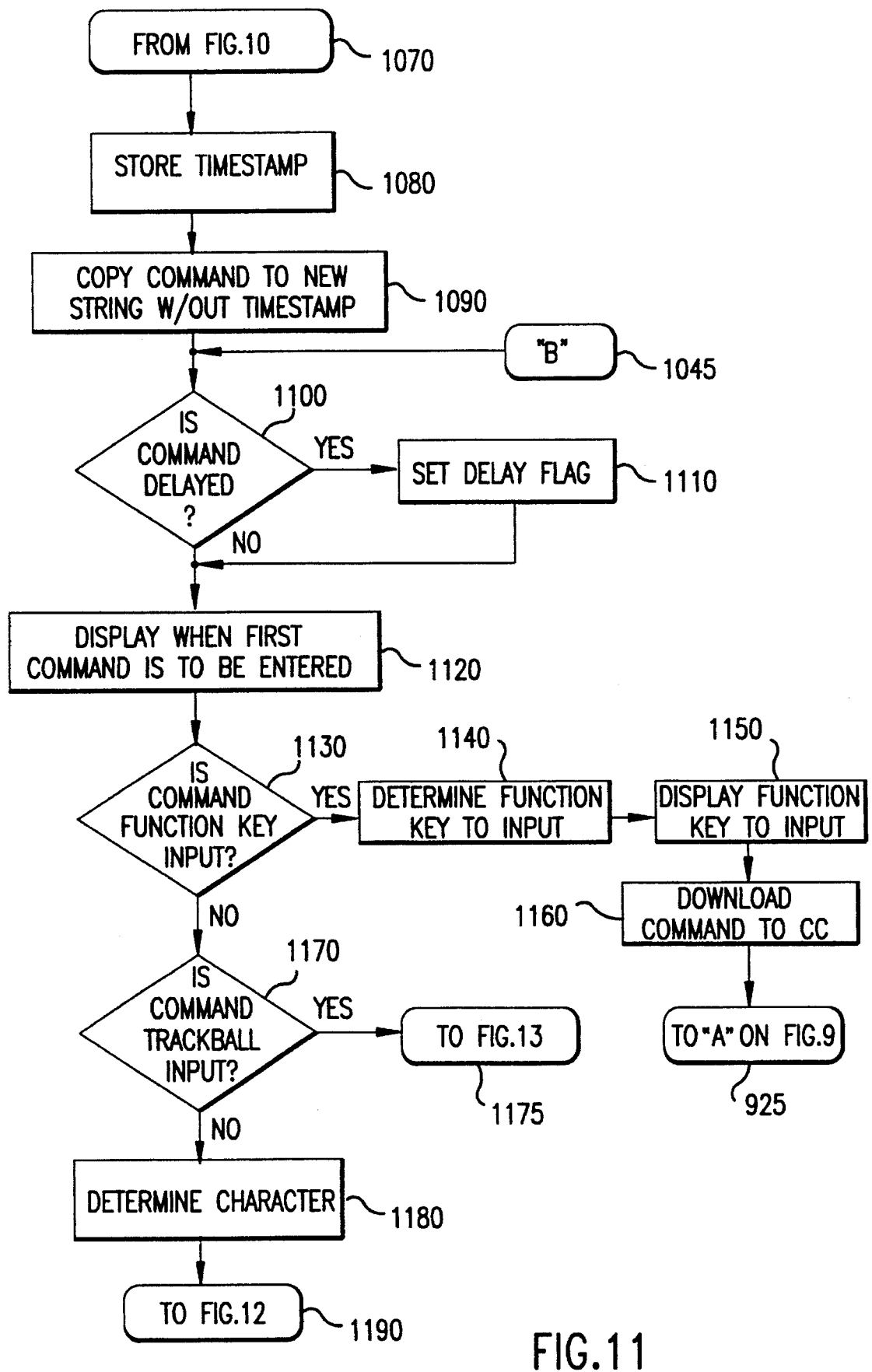

From block 990 of FIG. 10, flow passes to block 1000. In block 1000, the second line is appended to the preceding line, since it was stored and identified as a multi-lined command. From block 1000, flow passes to block 1010 wherein the next line in the file is checked to determine whether the character in the fourth column indicates a further continuation of the message. Flow then passes to decision block 1020 to determine if the next line is to be appended. If the next line is to be appended, flow then passes to the connection block 975, shown in FIG. 9, to provide flow back to block 970 and a repeat of the preceding steps. If the line is not to be appended, flow then passes to block 1030, as would the flow from decision block 960 through the connection block 965, when a multiple line command is not present.

In block 1030, the character in the fifth column of the message is checked to determine which control console is to receive the message, and thereby identifying which of the input/output ports of the I/O interface 180 will be utilized for the associated command. From block 1030 the flow passes to decision block 1040 where it is determined whether the message is time stamped, that is, whether it includes a reference time value in the columns 7–12 of the message. If such is provided, the message will not be transmitted to the designated control console until the time-of-day clock data maintained by the clock subsystem 260 corresponds to the reference time associated with the message. As the time-of-day data maintained by clock 260 is synchronized with the time-of-day data of the control consoles, the simulated entry data transmitted to the console will correspond with other events being simulated, such as particular movements of aircraft which would require entries from the console keyboard 150, if such were manned.

If the data in the file is not time stamped, flow passes to the connector block 1045. If on the other hand, the data is time stamped, flow passes to block 1050 wherein the time stamp flag is set. From block 1050, the flow passes to the decision block 1060 for determination as to whether the time stamp is valid. If such is not valid, flow passes to connector block 925 of FIG. 9, for reading the next line of the script file. Thus, if the time stamp is invalid, such as requiring a time-of-day for transmission which has already transpired, then the message is ignored and the next record is read. If the time stamp is valid, then flow passes to the connector block 1070. From the connector block 1070, shown on FIG. 11, the flow passes to block 1080, wherein the reference time is stored in memory. From block 1080, the flow passes to block 1090, wherein the reference time is stripped from the message for processing of the command portion thereof. From block 1090, the flow passes to the decision block 1100, as does the flow from the connector block 1045, which is the entry point for flow from block 1040, shown in FIG. 10, for un-time stamped messages.

In decision block 1100, it is determined whether the simulated entry is to be delayed, which is a user selectable option to delay transmission of the message based on the delay time selected and stored by the delay routine, shown in FIG. 6. If the command is to be delayed, the delay flag is set in block 1110, and then subsequent to setting the delay flag or where no delay is to be utilized, the flow passes to block 1120. In block 1120, a display is generated when the first command is to be transmitted to the main display controller 130 of a control console 100, such not occurring immediately if the time stamp or delay flags are set. If the time stamp flag was set, the transmission of the command will not occur until there is a correspondence between the reference time stored in step 1080 and the current time-ofday established by clock 260. If the delay flag had been set, then that delay time period must first expire before the command is transmitted to the appropriate control console, as indicated in the fifth column of the message, and that fact being displayed on display monitor 190 of the emulator system 10.

From block 1120 the flow passes to decision block 1130 wherein it is determined whether the command simulates the operation of a function key. If the command is a function key input, the flow passes to block 1140 wherein the command is mapped to the appropriate code for the particular function key selected. As previously described, the script file utilizes alphanumeric labels to identify the function keys of the console keyboard 150, of which there are twelve fixed function keys, commonly called "hard" function keys, and seventy-two programmable function keys, commonly referred to as "soft" function keys. Thus, the literal descriptors must be converted to the appropriate code (i.e. a predetermined hexadecimal code) which would be generated by the console keyboard 150, if that particular key were depressed by a user. This conversion process for function keys is carried out in block 1140. From block 1140, the flow passes to block 1150 wherein the function key entry to be transmitted is displayed on monitor 190. Flow then passes to block 1160 wherein the command is transmitted to the particular main display controller 130 by the input/output interface 180. Flow then passes back to block 925, shown in FIG. 9, to read the next line from the script file.

If the command is not a function key input, flow passes from block 1130 to decision block 1170 wherein it is determined whether the command is a track ball input. If the command is a track ball input, the flow passes to the connector block 1175. On the other hand, if the command is not a track ball input then such must be a character and flow passes to block 1180. In block 1180, the binary coded representation of the character, as provided from the emulator keyboard 240 must be converted to the code utilized by the console keyboard 150, for that character. Thus, the step represented by block 1180 includes a mapping function for converting the character code to one which is compatible with that utilized by the control consoles. From block 1180, the flow passes to the connector block 1190.

Figure 12:
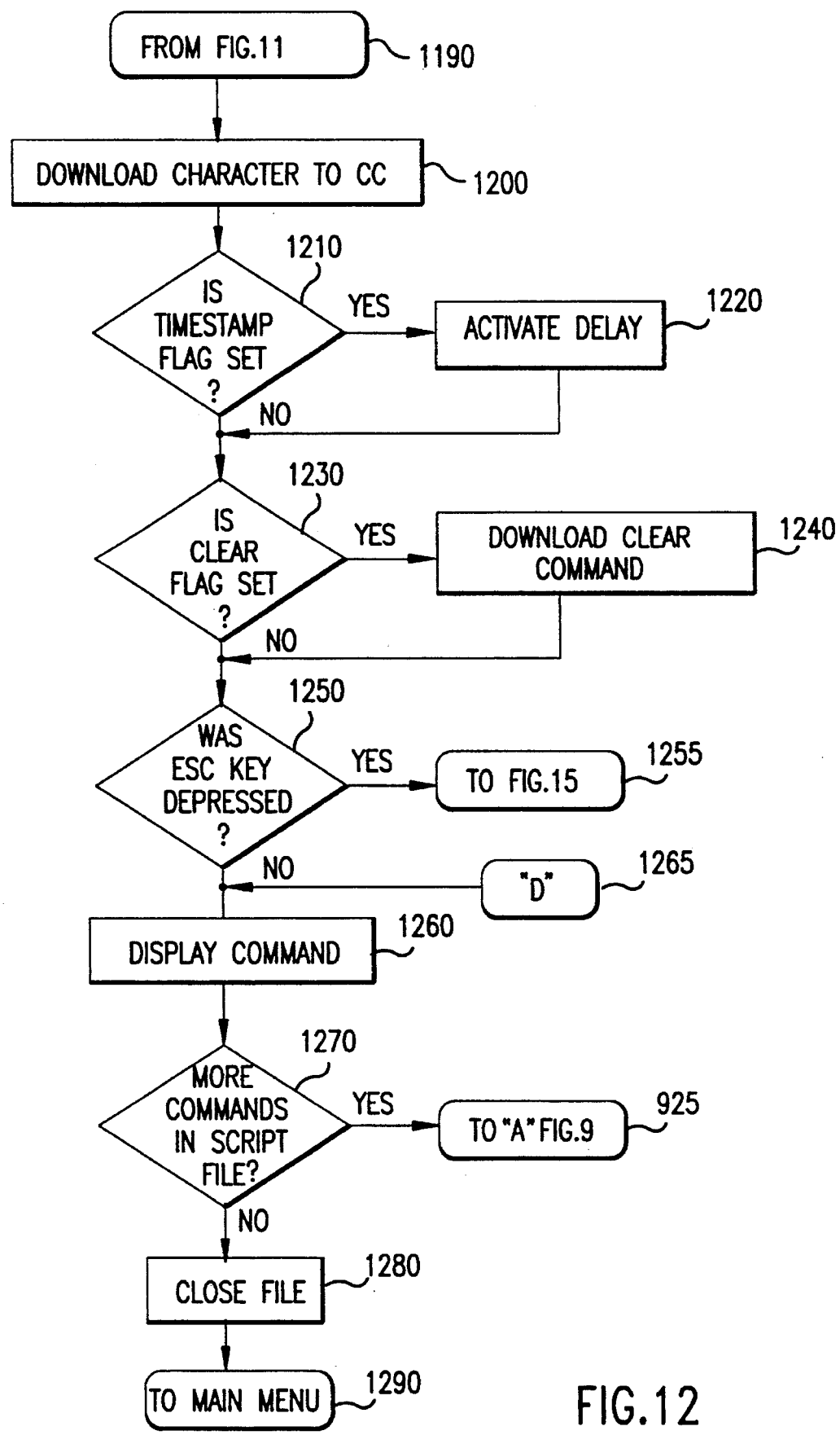
Figure 13:
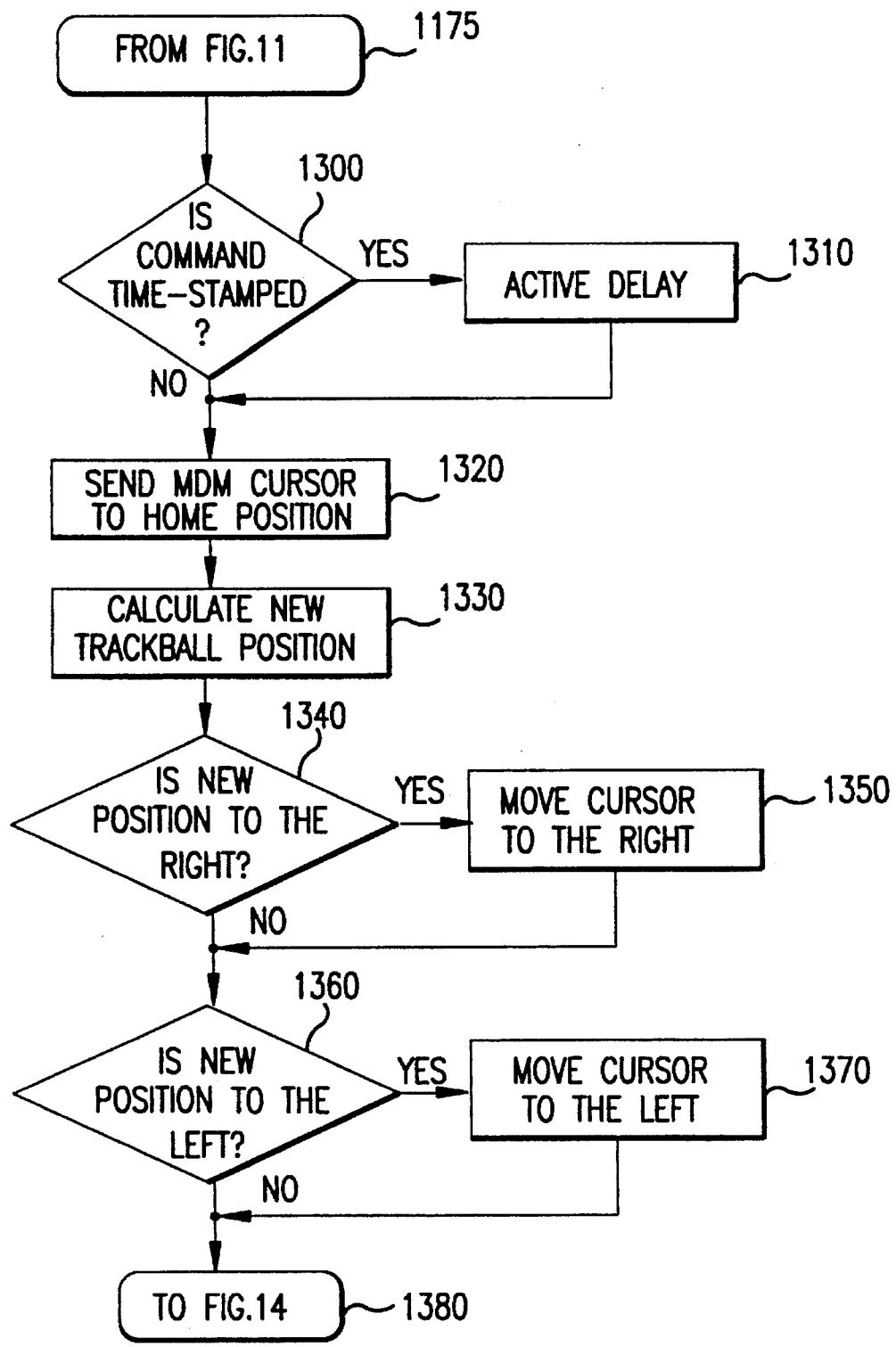

From the connector block 1190, shown in FIG. 12, the flow passes to block 1200, indicating the step of transmitting the converted character code to the control console. From block 1200, the flow passes to decision block 1210 which determines whether the time stamp flag has been set, and activates a short predetermined delay if it has, as indicated in block 1220. If the flag has not been set, or subsequent to the predetermined delay provided in block 1220, the flow passes to decision block 1230. Block 1230 determines whether the "CLEAR" flag has been set and passes the flow to block 1240 if it has. In block 1240, the "CLEAR" command is transmitted to the control console, in the appropriate format. If the "CLEAR" flag has not been set, or subsequent to transmission of the "CLEAR" command, the flow passes to decision block 1250 for determination as to whether the "ESCAPE" key on the emulator keyboard 240 has been depressed. If such has occurred, flow passes to connection block 1256, otherwise flow passes to block 1260, as does the flow from the connection block 1265 which originates from the flow diagram of FIG. 15.

In block 1260, the command which was transmitted to the control console is displayed on display monitor 190 of the keyboard emulator system 10. From block 1260, the flow passes to the decision block 1270 where it is determined whether there are more commands to be read from the script file. If more commands are to be read, flow passes to the connector block 925 which brings the flow back to block 930, shown in FIG. 9, wherein another line of data is read from the script file. If no further commands are to be read from the script file, however, the flow passes from decision block 1270 to block 1280. In block 1280, the script file is closed and the flow then passes back to the main menu as indicated in 1290.

Referring back to FIG. 11, decision block 1170 determines whether the command being processed is a simulated track ball input. If the command is a simulated track ball input, the flow passes to connector block 1175. The flow passes from connector block 1175, shown in FIG. 13, to decision block 1300 which determines whether the track ball command is time stamped, by checking the status of the time stamp flag, not unlike the step previously discussed relative to block 1210. If the time stamp flag is set, flow passes to block 1310 to activate the predetermined delay as discussed previously with respect to block 1220. Subsequent to this delay or immediately if the time stamp flag is not set, flow passes to block 1320 for commanding the cursor of the main display monitor 120 of the appropriate control console 100 to move to the "HOME" position, the center of the screen. In one particular working embodiment, the "HOME" position is pixel location 1024, 1024, for a display having 2048 pixels in both X and Y directions. Flow then passes to block 1330 where the new track ball position is calculated based on the script file entries.

From block 1330, the flow passes to decision block 1340 wherein it is determined whether the new position is to the right of the "HOME" position. If the new position is to the right, then flow passes to block 1350 wherein the command to move the cursor the appropriate amount to the right is transmitted. Subsequent to moving the cursor, or if the cursor is not to the right of the "HOME" position, the flow passes to decision block 1360, wherein the command is tested to determine if the new position is to the left of the "HOME" position. If the position is to the left, then flow passes to block 1370 wherein the command to move the cursor to the appropriate point to the left is transmitted. Subsequent to such transmission, or in the alternative, if the position was not to the left, flow passes to the connection block 1380.

Figure 14:
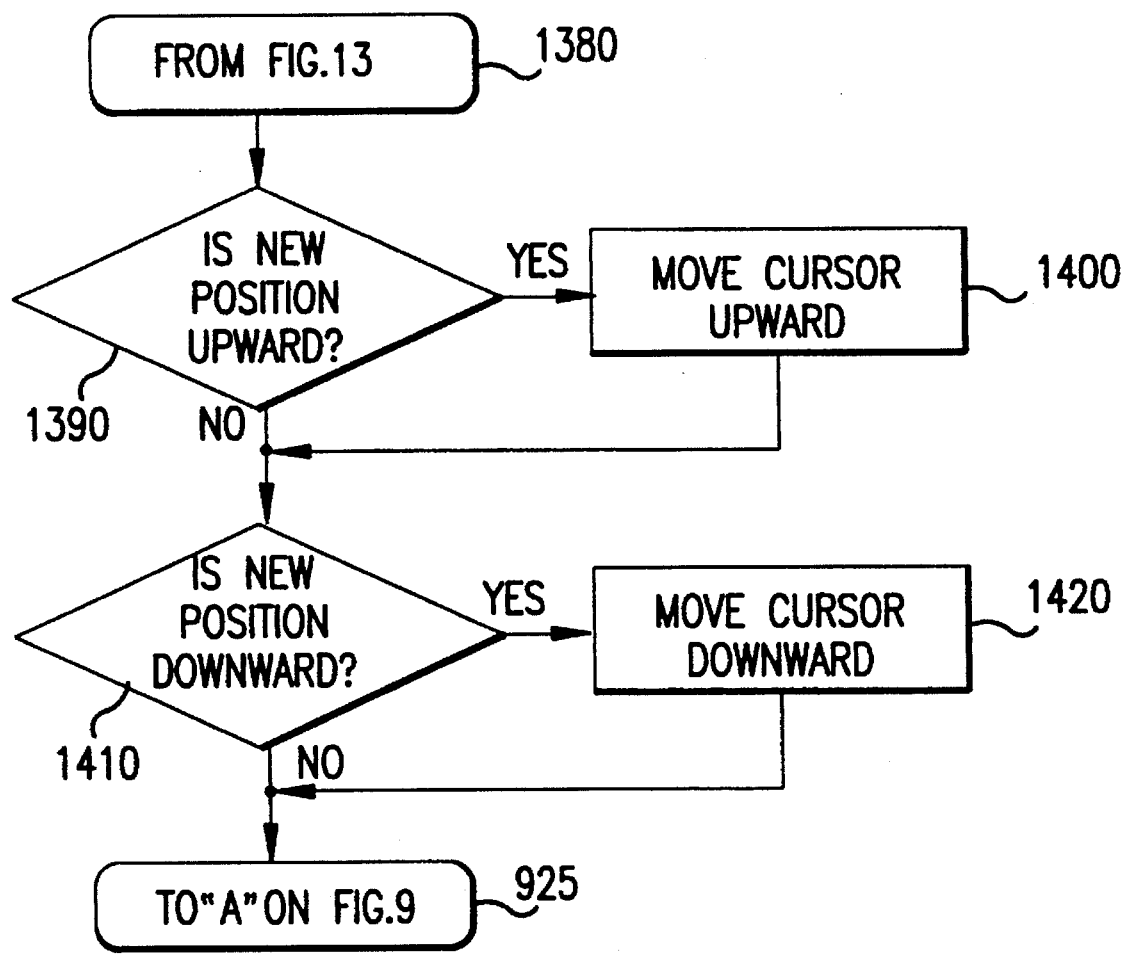

From the connection block 1380, shown in FIG. 14, the flow passes to decision block 1390. In decision block 1390 the position calculated in block 1330 is tested to determine if it is above the "HOME" position. If that test is answered in the affirmative, then flow passes to block 1400 for transmission of the cursor movement command, to move the cursor the appropriate amount above the level of the "HOME" position. Subsequently, flow passes to decision block 1410, as does the flow if the new position was not above the "HOME" position. Block 1410 tests to determine if the calculated position is below the "HOME" position, thus indicating a downward displacement of the cursor. If the new position is below the "HOME" position, flow passes to block 1420 wherein the command to displace the cursor the appropriate amount in the downward direction is transmitted. If the new position is not below the "HOME" position, or in the alternative, after the downward displacement command is transmitted, flow passes to the connector block 925 which brings the flow back to block 930 of FIG. 9, wherein the next line from the script file is read.

Figure 15:
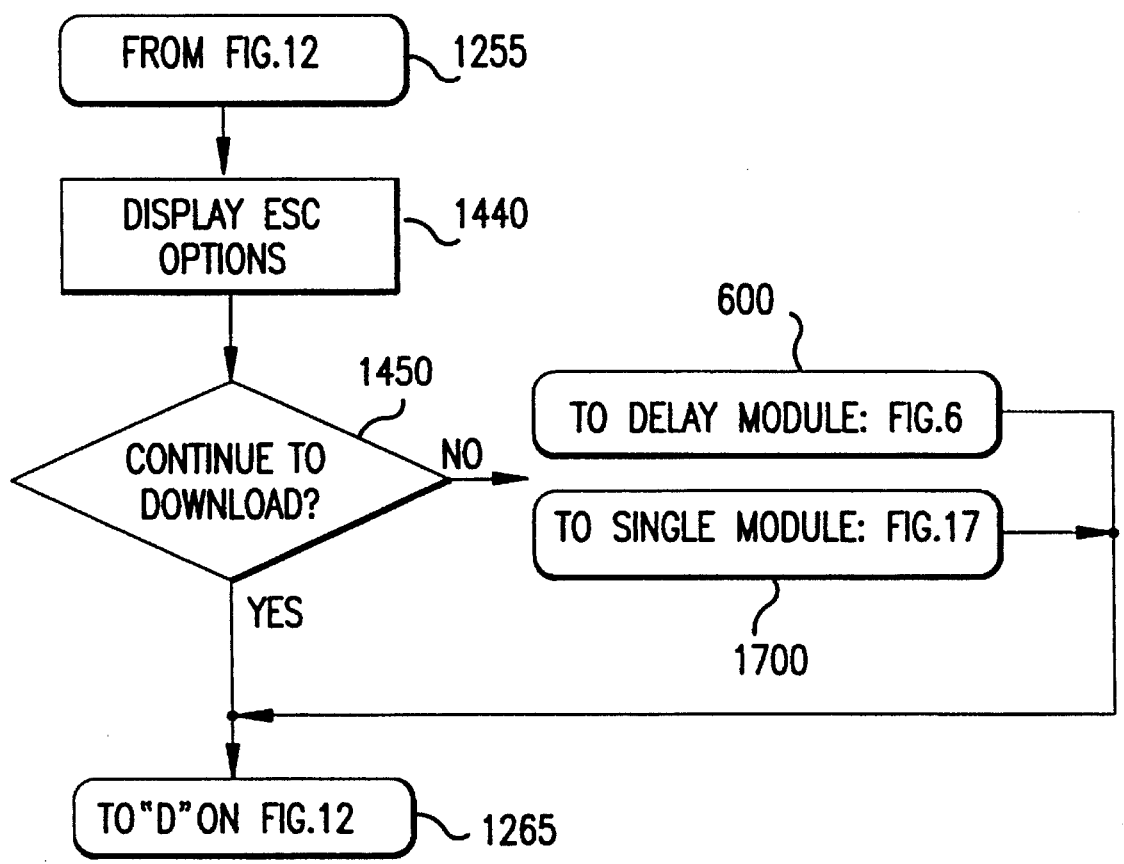
Figure 16:
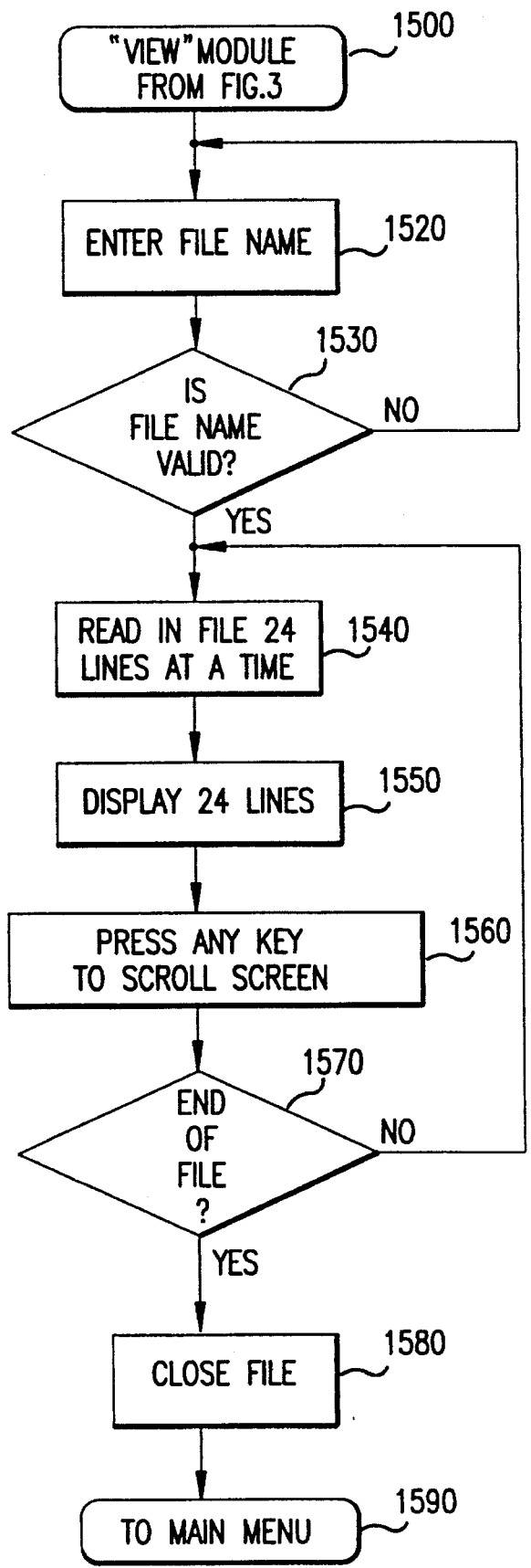
FIG. 16 is a flow diagram of the "View" module.

If the "ESCAPE" key has been depressed, then flow from decision block 1250 (FIG. 12) is transferred to the connection block 1255. Flow from connection block 1255 passes to block 1440, as shown in FIG. 15. Block 1440 represents the step of displaying particular options to the user on display monitor 190 of keyboard emulator system 10. The options displayed allow the user to (1) jump to the delay routine, for changing the delay between consecutive messages stored in the script file, (2) jumping to the "Single" module, which permits individual simulated key or track ball entries to be transmitted by the user, allowing the user to manually enter commands at any time during the processing of a script file, or (3) continuing with the script file processing. If the user simply wants to pause the system, the "ESCAPE" key on the emulator keyboard 240 serves that function. To continue processing, the user just makes that selection, and the flow passes to connection block 1265 wherein the flow passes back to block 1260, shown in FIG. 12. If on the other hand, the delay function is selected, flow passes to the connection block 600 for coupling to block 620, shown in FIG. 6. Lastly, if the user wishes to manually enter a command, the flow, subsequent to such selection, passes to the connection block 1700.

If during the display of the main menu, the user wished to just review the contents of a file, such as a script file, the flow would pass from block 370, shown in FIG. 3, to connection block 1500. From connection block 1500, shown in FIG. 16, flow passes to block 1520, where the user enters the file name which is to be viewed. Subsequent to entry of the file name, the flow passes to block 1530, wherein the file name is checked to determine if it is valid. If it is not, flow passes back to block 1520, where the user is appropriately prompted to enter a valid file name. Otherwise, flow passes from block 1530 to block 1540. In block 1540, the file is read, twenty-four lines at a time. From block 1540, the flow passes to block 1550, indicating the step of displaying the twenty-four lines read, which thereby substantially fills the screen of display monitor 190, leaving only the 25th line, which is reserved for prompts and messages. Flow then passes to block 1560, wherein a message is displayed on the twenty-fifth line of display 190 indicating that depression of any key on emulator keyboard 240 will scroll the next twenty-four lines onto the screen. Subsequent to depression of any keyboard key, flow passes to decision block 1570 for determination of whether the end of the file being read has been reached. If it has not, flow passes back to block 1540 for reading of the next twenty-four lines. If or when the end of the file has been reached, flow passes to block 1580 where the file is closed. Then, the flow passes to block 1590 for return to the main menu.

Figure 17:
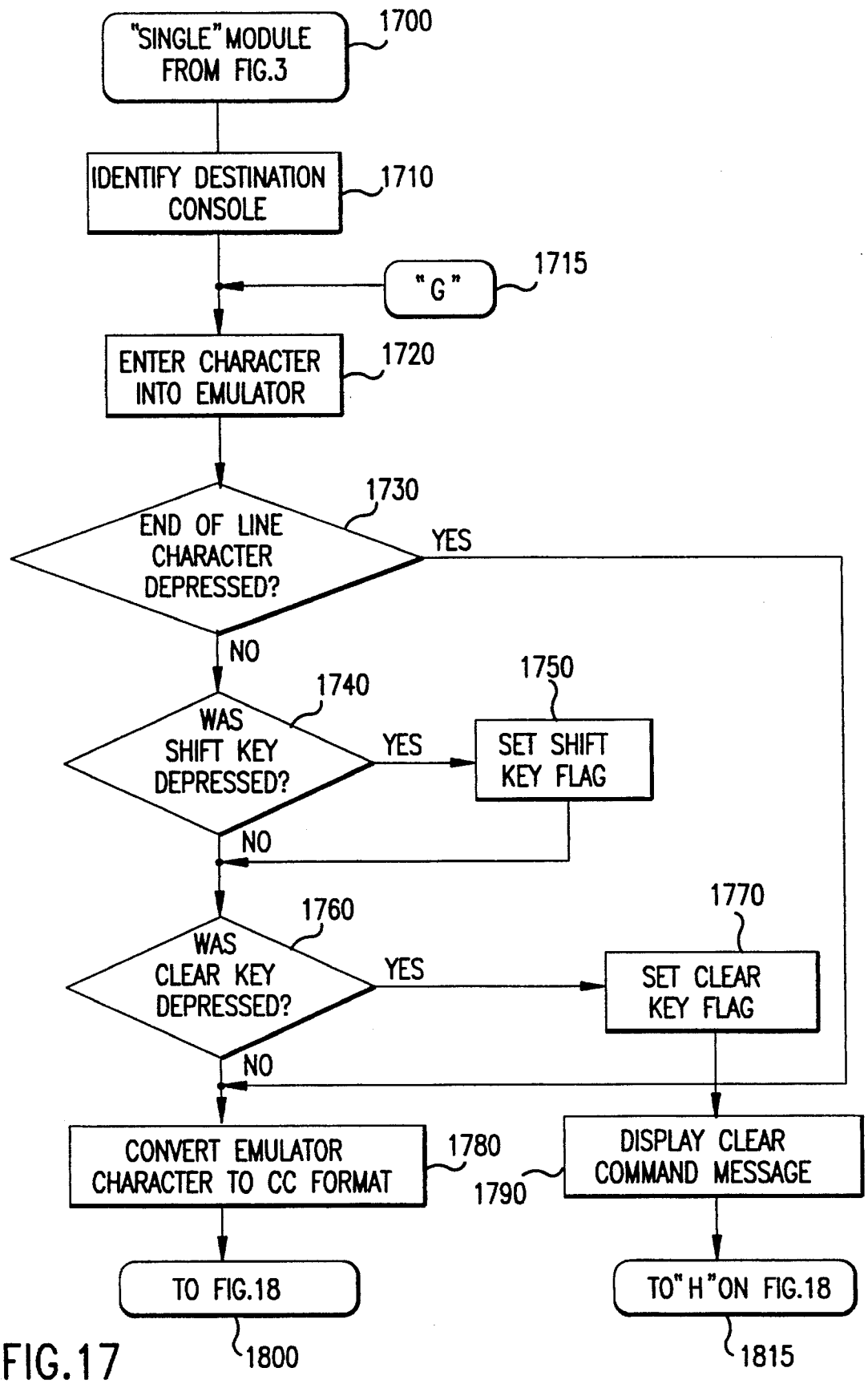
FIGS. 17–18 are flow diagrams representing the "Single" transmission module.
Figure 18:
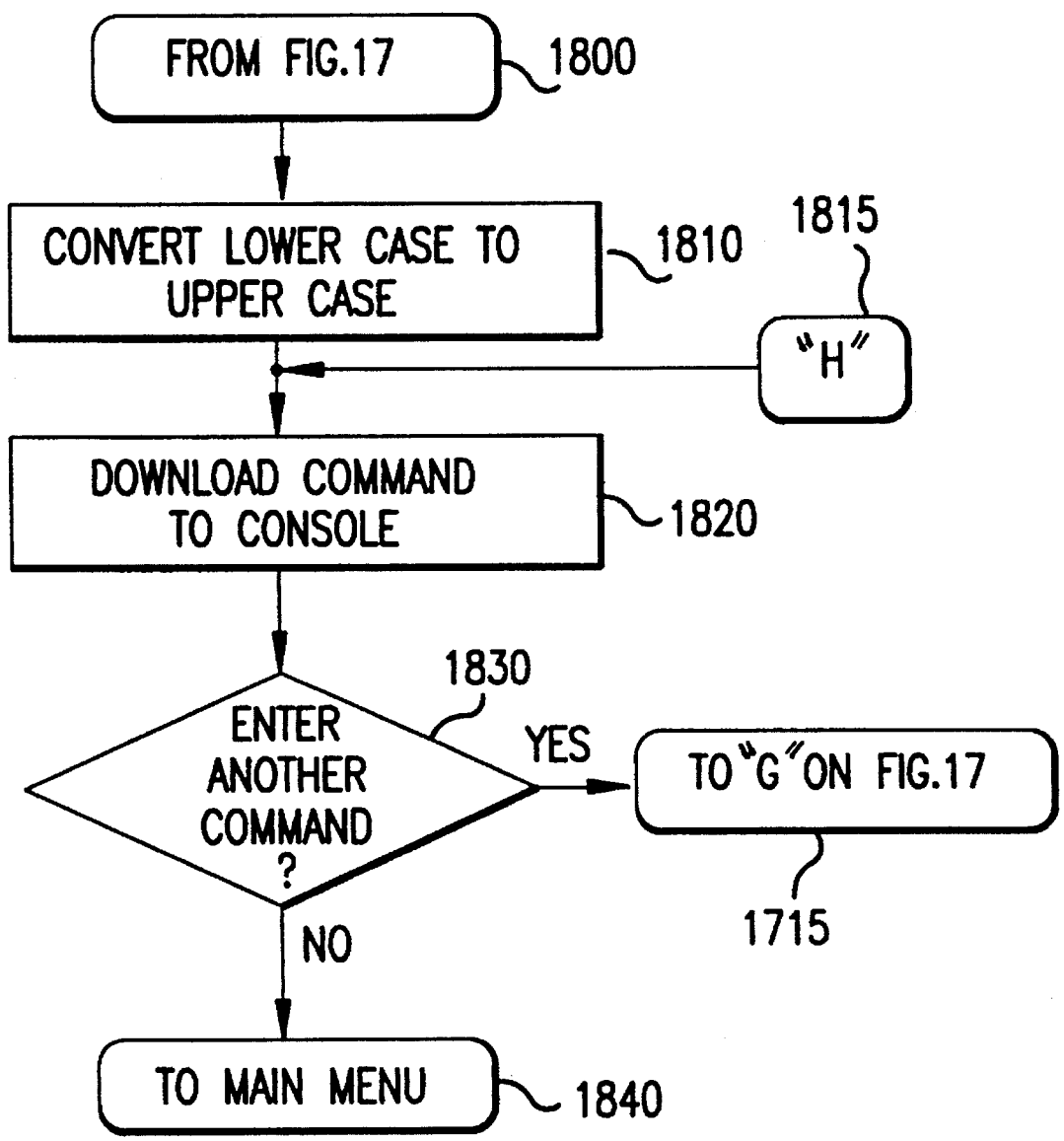

If the user has selected the "Single" command routine from the main menu (FIG. 3) or from the "ESCAPE" option menu (FIG. 15) the subroutine shown in FIG. 17 is entered. Flow passes from the entry point 1700 to the block 1710 where the user is asked to identify which console the simulated key entry is to be sent. When the console is identified, by entry of a representative code, such identifies the appropriate I/O port of I/O interface 180. From block 1710 the flow passes to the block 1720 wherein the user enters a character from the emulator keyboard 240. Flow from the connection block 1715 also passes to block 1720. The origin for the flow from block 1715 will be described in following paragraphs.

Subsequent to entry of a character, the flow passes to decision block 1730 for determination as to whether the character is an end-of-line character, such character being indicated by a "Backslash". If the end-of-line character is detected, flow passes to block 1780, otherwise flow passes to decision block 1740. Decision block 1740 determines whether the shift key has been depressed, and if such is detected, flow passes to block 1750 wherein the shift key flag is set, which is utilized in the process of converting the character codes. If depression of the shift key is not detected or subsequent to setting the shift key flag, the flow passes to decision block 1760 for determining whether the "CLEAR" key has been depressed. If the "CLEAR" key has been depressed, the flow passes to block 1770 for setting the "CLEAR" key flag. Subsequent to setting the "CLEAR" key flag, flow passes to block 1790 wherein a message is displayed on emulator monitor 190 indicating that the "CLEAR" key has been depressed. From block 1790, flow passes to the connector block 1815 for passing the flow to block 1820, shown in FIG. 18.

If the "CLEAR" key was not depressed, flow passes from decision block 1760 to block 1780, where the entered emulator character is converted to the format of the control console, as has previously been described. From block 1780, the flow passes to the connector block 1800. From connector block 1800, shown in FIG. 18, the flow passes to block 1810 for conversion of lower case characters to upper case, responsive to absence of the shift key flag. From block 1810, the flow passes to block 1820, as does the flow from connector block 1815, which flow originated from block 1790, of FIG. 17. In block 1820, the command entered from the emulator keyboard and subsequently converted to the control console format is transmitted to the selected console 100. Subsequent to transmission of the command, flow passes to decision block 1830 wherein the user is prompted as to whether additional commands are to be manually entered. If additional commands are to be entered, flow passes to connection block 1715 which in turn transfers the flow back to block 1720, shown in FIG. 17. If no other commands are to be manually entered, then flow passes to block 1840, wherein the program returns to the main menu. If the user selects the "EXIT" function from the main menu, flow would pass from decision block 370 to block 1900 of FIG. 7, which flow diagram has previously been described for the "Reset" function.

Keyboard emulator system 10 provides unique capabilities for the testing of data processing terminals which are part of a complex real time processing system. System 10 provides a method for providing automatic testing, as part of a diagnostic procedure, or for acceptance testing of systems or components thereof. In particular, system 10 provides the ability to establish a predetermined sequence of simulated keyboard entries which can be transmitted to any of a plurality of control consoles at predetermined times, such times being synchronized with a time-of-day clock 146 of a control console 100. Additionally, the rate at which commands are read from the script file, the file in which the sequence of simulated key entries are stored, is adjustable by means of selected or user defined delay times, to allow for rapid automated operation, or operation which is slowed down sufficiently to permit monitoring and intervention by a user. These features are of particular importance, where simulated key entries must correspond in time with events, real or simulated, which are entered into the real time data processing host computer 102.

Still further, system 10 provides an ability to enter simulated key entry data utilizing alphanumeric tags or labels, words representing the particular simulated function to be transmitted. Keyboard emulator system 10 converts these groupings of characters into the particular code utilized by the console keyboard 150 to represent the identified keyboard key depression. Similarly, the input from the track ball cursor positioning device 160 of the control console 100 is simulated by keyboard emulator system 10. Track ball entries are coded, using alphanumeric characters, and then translated to the code format compatible with control console 100.

Alternatively, track ball entries and keyboard entries can be transmitted from control console 100 through the data link 152, shown in FIG. 1, to the input/output interface 180. System 10 can then transfer these entries into a file for subsequent playback to the control console 100. As these entries are made from the track ball 160 and/or the keyboard 150, no conversion is necessary, the codes stored are in the format required by the main display controller 130. Control console 100 can be easily returned to manual operation, the keyboard emulator system 10 need not be uncoupled from the data links 152 and 172 to accomplish coupling of keyboard 150 to main display controller 130. Keyboard emulator system 10 can be utilized to daisy chain the keyboard and track ball entries transmitted over data link 152 back to the console through the data link 172, permitting a great savings in time and labor where the control console is to be tested intermittently over extended periods of time, since no changes in cabling are required.

Although this invention has been described in connection with the specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is being claimed is:

1. A keyboard emulator for coupling to at least one control console of a real time processing system having a console keyboard, a cursor positioning device, and a display controller, comprising:

input/output interface means coupled to both said console keyboard and said display controller for receiving first keyboard command signals from said console keyboard and transmitting second keyboard command signals to said display controller;

an emulator keyboard for entering emulator commands, emulator data, and a reference time value, said emulator data including character data and cursor position simulation data, said character data including a plurality of sequences of characters where each of said plurality of character sequences spells out a console keyboard switch function, said cursor position simulation data being entered as x,y coordinates;

emulator processing means coupled to said emulator keyboard and said input/output interface means for establishing a succession of said second keyboard command signals and controlling transmission thereof, said emulator processing means including:

a. clock means for maintaining a first time-of-day count data, said first time-of-day count data being consecutively increased by a predetermined increment, b. means for initializing said first time-of-day count data with a second time-of-day count data read from said display controller of said control console, said means for initializing said first time-of-day count data with said second time-of-day count data including (1) means for reading said second time-of-day count data from said display controller of said control console, and (2) means for substituting said second time-of-day count data for a respective value of said first time-of-day count data, c. means for entering said first keyboard command signals from said console keyboard into a first script file for subsequent transmission as said second keyboard command signals to said display controller, said first keyboard command signal entering means including means for time stamping said first keyboard command signals entered into said first script file, said time stamping means including means for entering time reference data defined by a concurrent value of said first time-of-day count data into said first script file in correspondence with said entered first keyboard command signals, d. means for entering said emulator data and time reference data defined by said reference time value into a second script file, and e. means for reading a selected one of said first and second script files, said script file reading means including means for converting said emulator data to said second keyboard command signals;

display monitor means coupled to said emulator processing means for displaying said emulator commands, emulator data, and reference time values; and, storage means coupled to said emulator processing means for storage of said first and second script files, said emulator processing means sequentially reading one of said script files to form said succession of said second keyboard command signals responsive to a predetermined one of said emulator commands, said emulator processing means transmitting said second keyboard command signals responsive to a correspondence between said time reference data and said first time-of-day count data, said emulator processing means including edit means for (1) appending additional emulator data and reference time values in a selected one of said script files, and (2) displaying at least a portion of said selected script file on said display monitor means.

2. The keyboard emulator as recited in claim 1 where said second keyboard command signals include keyboard entry data and cursor position entry data.

3. The keyboard emulator as recited in claim 2 where said cursor position entry data represents data simulating a track-ball cursor positioning device.

4. The keyboard emulator as recited in claim 3 where said emulator data includes character data and cursor position simulation data, said cursor position simulation data being entered as a pair of positioning coordinates from said emulator keyboard.

5. The keyboard emulator as recited in claim 4 where said emulator processing means converts said cursor position simulation data to said cursor position entry data.

6. The keyboard emulator as recited in claim 1 where said input/output interface means includes a plurality of input/output ports, each of said plurality of input/output ports being coupled to a respective control console for transmitting selected second keyboard command signals to respective control consoles substantially simultaneously.

7. A keyboard emulator for coupling to a plurality of control consoles of a real time processing system, each of said control consoles having a console keyboard, a track ball and a display controller, said keyboard emulator comprising:

input/output interface means coupled to both said console keyboard and said display controller of each of said plurality of control consoles for receiving respective keyboard command signals and track-ball command signals from each of said console keyboards and transmitting keyboard entry data and track-ball entry data to respective display controllers of said plurality of control consoles, said input/output interface means including a plurality of input/output ports, each of said plurality of input/output ports being coupled to a display controller of a respective control console for selectively transmitting keyboard entry data and track-ball entry data to respective control consoles substantially simultaneously;

an emulator keyboard for entering emulator commands, emulator data and reference time values, said emulator data including character data and cursor position simulation data, said cursor position simulation data being entered as x,y coordinates;

emulator processing means coupled to said input/output interface means and said emulator keyboard for establishing a succession of said keyboard entry data and track-ball entry data for each of said plurality of control consoles and controlling transmission thereof, said emulator processing means including:

a. clock means for establishing and continuously incrementing first time-of-day count data, b. means for reading second time-of-day count data from a display controller of one of said plurality of control consoles, c. means for substituting said second time-of-day count data for a respective value of said first time-of-day count data, d. means for entering said keyboard command signals and as said keyboard entry data and said track-ball command signals as said track-ball entry data into a first script file, e. means for time stamping said keyboard command signals and said track-ball command signals entered into said first script file, said time stamping means including means for entering time reference data defined by a concurrent value of said first time-of-day data into said first script file in correspondence with said entered keyboard and track-ball command signals, f. means for entering said emulator data and time reference data defined by said reference time values into a second script file, g. means for sequentially reading a selected one of said first and second script files to form a time ordered succession of said keyboard entry data and said track-ball entry data responsive to a predetermined one of said emulator commands, said script file reading means including means for converting said character data to said keyboard entry data and means for converting said x,y coordinates to said track-ball entry data, h. means for transmitting said keyboard entry data and said track-ball entry data from a selected one of said first and second script files responsive to a correspondence between said time reference data and said first time-of-day count data, and i. edit means for (1) appending emulator data and reference time values to a selected one of said first and second script files;

display monitor means coupled to said emulator processing means for displaying said emulator commands, emulator data and at least a portion of said selected script file; and, storage means coupled to said emulator processing means for storage of said first and second script files.

\* \* \* \* \*